Figure 1:
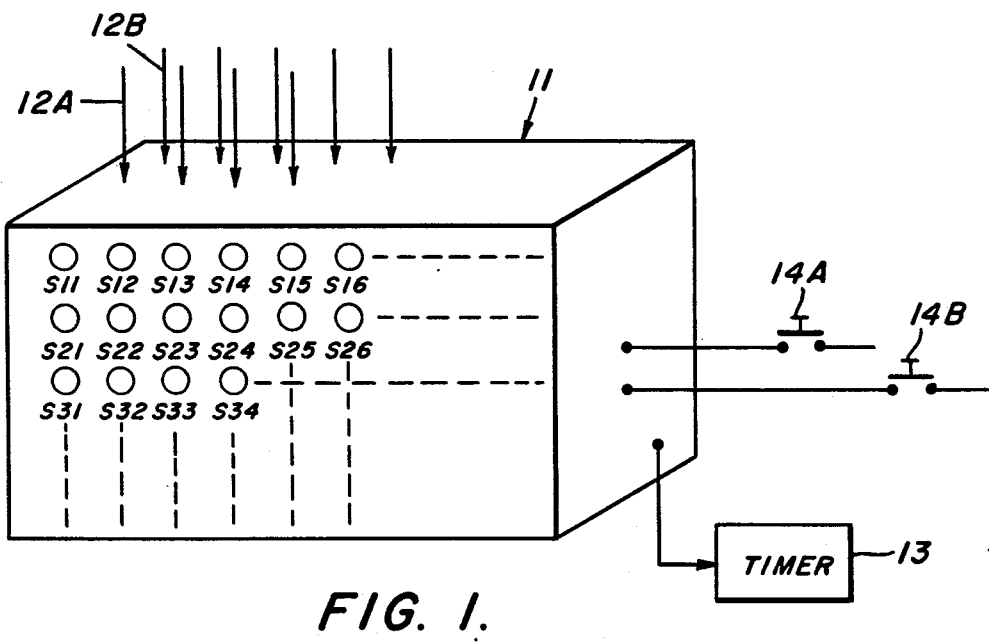

United States Patent [19]

Conrad

[11] 4,011,409
[45] Mar. 8, 1977

[54] COMMUNICATION SYSTEM TO MONITOR INDIVIDUAL SUBSCRIBERS

[76] Inventor: Robert K. Conrad, 432 Morewood Ave., Pittsburgh, Pa. 15213

[22] Filed: Apr. 2, 1976

[21] Appl. No.: 669,801

[52] U.S. Cl. .............................................. 179/2 A
[51] Int. Cl.² ...................................... H04M 11/00
[58] Field of Search .............. 179/1 MN, 2 R, 2 A, 179/2 AS

*Primary Examiner*—George G. Stella
*Attorney, Agent, or Firm*—Brown, Murray, Flick & Peckham

[57] ABSTRACT

Individual subscribers belonging to a class including superannuated, disabled, sick and medically unstable are monitored in a communication system by establishing time-based periods for telephone link responses between each subscriber and a monitor station where separate electrical signals are produced corresponding to the telephone link responses. The electrical signals are used to energize indicator means including lights used to detect a failure of a subscriber to respond according to the established time-based period for a telephone link response. An alert is provided on behalf of a subscriber based on the detected failure of a subscriber to respond. The indicator means is reset at preselected intervals of time corresponding to the time-based periods for telephone link responses.

5 Claims, 2 Drawing Figures

COMMUNICATION SYSTEM TO MONITOR INDIVIDUAL SUBSCRIBERS

BACKGROUND OF THE INVENTION

This invention relates to a communication system adapted to monitor individual subscribers belonging to a class of people typically characterized as superannuated, disabled, sick and/or medically unstable. More particularly, the present invention relates to a communication system for monitoring such individual subscribers by establishing time-based periods for telephone link responses by the subscribers so as to provide an alert on behalf of a subscriber in the event of a detected failure of a subscriber to respond via a telephone link within the time-based period established for response.

There exists in today's society a segment of people ever increasing in size, which are not institutionalized or for other reasons do not receive a continuous systemic attention to their everyday well-being. Typically, for example, superannuated people with actual or potential health vulnerability live along in populated communities with a constant concern and a frequent fear that they will be suddenly strickened and remain unattended for days without life-saving attention. Such persons belong to a class of people that also includes the disabled, the sick and medically unstable that frequently live alone and where an assurance of alert to action will alleviate their fears as well as save suffering expense and even their lives. It will be understood, of course, that many such people do not require continuous periodic care of attention by trained or untrained personnel even if it were economically feasible to subscribe for such services.

This invention relates to a communication system that bridges such a gap in today's society for the class of residence as typified above, particularly in established population centers such as cities including rural communities.

SUMMARY OF THE INVENTION

It is an object of the present invention to provide a communication system to monitor individual subscribers belonging to a class including superannuated, disabled, sick and medically unstable by establishing a time-based period for telephone link responses between subscribers belonging to this class of people and a monitor station to thereby provide an alert on behalf of a subscriber based on a detected failure to respond according to the established period for a telephone link response.

According to the present invention there is provided a communication system to monitor individual subscribers according to a method including the steps of establishing time-based periods for telephone link responses between each subscriber belonging to a class including superannuated, disabled, sick and medically unstable and a monitor station, producing separate electrical signals at the monitor station corresponding to the telephone link responses, using the separate electrical signals to energize indicator means at the monitor station, detecting from the indicator means a failure of a subscriber to respond according to the established time-based period for a telephone link response, providing an alert on behalf of a subscriber based on the detected failure to respond according to the established period for a telephone link response, and resetting the indicator means at preselected intervals of time corresponding essentially to the time-based periods for telephone link responses.

According to a preferred aspect of the present invention, an array of light indicators are energized by detected telephone link responses. An automatic telephone answering system is preferably employed to provide an electrical signal that actuates a flip-flop which, in turn, fires an SCR to apply an electric current to a light indicator.

Figure 2:
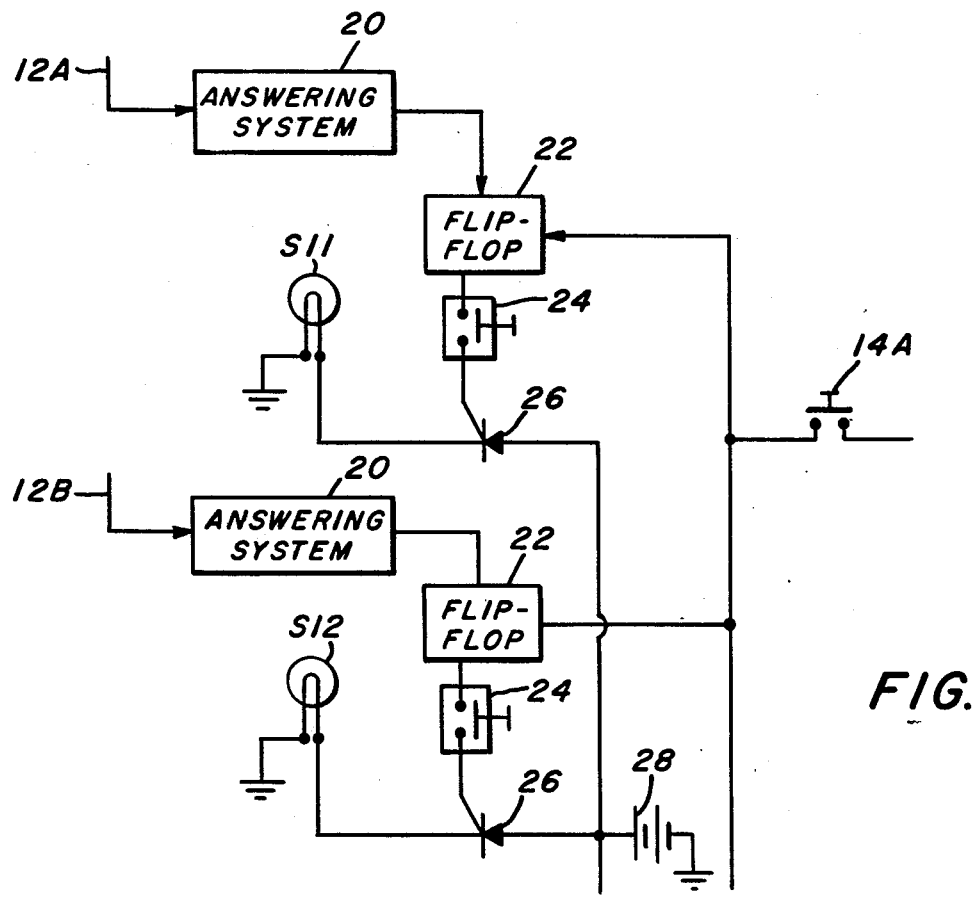

These features and advantages of the present invention as well as others will be more fully understood when the following description is read in light of the accompanying drawings, in which:

FIG. 1 is a perspective view of a monitor station for providing a method to communicate with individual subscribers according to the present invention; and FIG. 2 is a partial schematic diagram of an electrical system incorporated in the monitor station shown in FIG. 1 for detecting telephone link responses.

In FIG. 1, there is a typical illustration of a monitor 11 of the type which is suitable for carrying out the method of the present invention. The monitor includes an array of light indicators arranged as columns and rows and identified as S11, S12, S13 . . . and S11, S21, S31 . . . , respectively. Such light indicators are energized by telephone link responses from subscribers that are coupled to the monitor by lines 17A, 17B, etc. A timer 13 is coupled to the monitor to provide an attendant with a signal such as an audio or light signal for resetting one or more of the light indicators according to the method of the present invention. For this purpose, reset switches 14A, 14B are coupled to the monitor.

FIG. 2 illustrates a typical form of electrical circuitry employed in the monitor 11 to carry out the method of the present invention. A telephone line 12A forming a telephone link between a subscriber and the monitor station is coupled to an automatic telephone answering system 20 that responds to an incoming call. The answeing system is of a type that is well known in the art. The use of a telephone link between the subscriber and the monitor station is preestablished on time-based periods for response. It is contemplated, according to the present invention, that a period for response will be established of the order of 24 hours. This period can be decreased to 12 hours or less as required to meet the desires of an individual subscriber. After a time-based period for response is established, the subscriber initiates a telephone call by dialing a prearranged phone number which, in turn, energizes the answering system 20. The answering system provides an electrical signal to actuate a flip-flop 22. The flip-flop is reset by an electrical signal conducted through a switch 14A which is actuated at the monitor station by operating personnel at preselected intervals of time as may be detected by the signal formed by timer 13. In FIG. 2, switch 14A is used to reset the flip-flops of a plurality of answering systems where the time-based periods for response are the same. Other identical electrical circuits are associated with switches 14B, 14C, etc. for telephone links used on different time-based periods for responses by subscribers. Each of the reset signals is essentially based on the time-based periods for a telephone link response by a subscriber but in a time-displaced manner. The flip-flop 22 provides an electrical signal that is passed through a switch 24, when in its closed position, to an SCR (silicon-controlled rectifier) 26. The signal from the switch 24 is used to fire the SCR and thereby apply a voltage from a power supply such as a battery 28 to energize the light indicator S11.

Depending upon the established time-based periods for telephone link responses by individual subscribers, commonly established time-based periods for response with such subscribers will be incorporated into a common system wherein reset switch 14A will reset each flip-flop associated with the answering system for the telephone links with the subscribers. Moreover, a common power suply may be coupled to fire the SCR's in each detector system used to energize the light indicators. Prior to resetting the flip-flops that provide the electrical signal for energizing the various light indicators, an attendant at the monitor station makes a visual observation of the array of light indicators to determine if any indicators are not actuated pursuant to the preestablished time-based periods for the telephone link response with that subscriber. A detected failure of a subscriber to respond is used by the attendant to provide an alert on behalf of the subscriber. Such an alert would be carried out by a prearrangement with the subscriber to a relative, neighbor or representative to investigate, preferably through personal contact, with the subscriber. The switch 24 which is normally conductive to an electrical signal provided by a flip-flop 22, is placed in its inoperative position as shown in FIG. 2 when, for example, a subscriver provides information to the attendant at the monitor station of his planned absence from or acquiescence in the established time-based periods for telephone link responses. Typically, this may occur because of the subscriber's plans to be absent from his place of residence.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In a communication system to monitor individual subscribers belonging to a class including superannuated, disabled, sick and medically unstable, a method including the steps of:
   establishing time-based periods for telephone link responses between each subscriber belonging to said class and a monitor station,
   producing separate electrical signals at the monitor station corresponding to said telephone link responses,
   using said separate electrical signals to energize indicator means at said monitor station,
   detecting from said indicator means the failure of a subscriber to respond according to the established time-based period for a telephone link response,
   providing an alert on behalf of a subscriber based on the detected failure to respond according to the established period for a telephone link response, and
   resetting said indicator means at preselected intervals of time corresponding essentially to said time-based periods for a telephone link response.

2. The method according to claim 1 including the further step of disabling the indicator means used to detect an individual subscriber's telephone link response for a preestablished disruption period between the individual subscriber and the monitor station.

3. The method according to claim 1 wherein said indicator means at said monitor station include a light indicator for each telephone link.

4. The method according to claim 1 wherein the time-based periods for a telephone link response are less than or equal to 24 hours.

5. The method according to claim 1 wherein said indicator means at said monitor station include an array of light indicators.

* * * * *